UNITED STATES PATENT OFFICE.

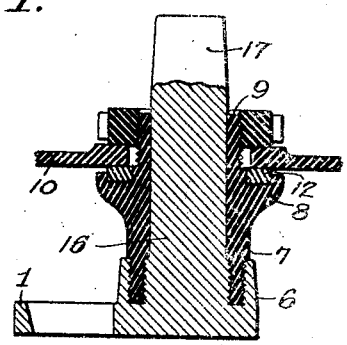
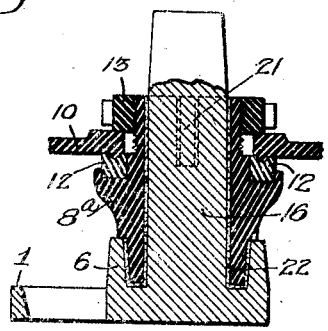
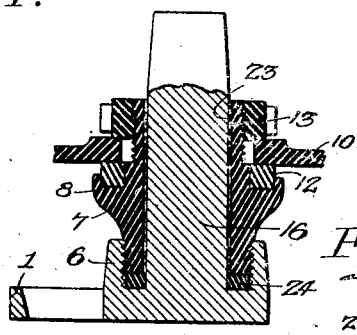
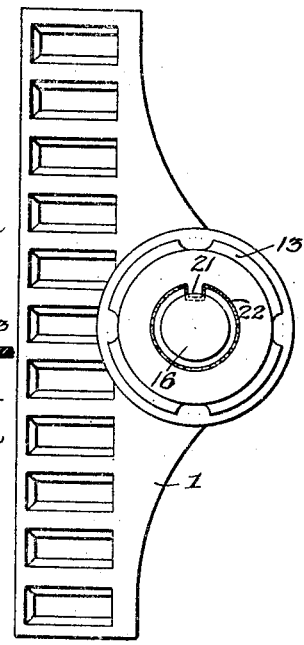
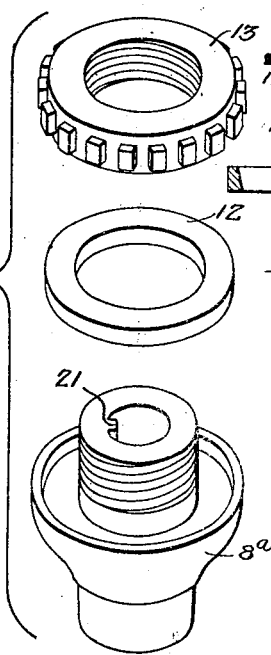
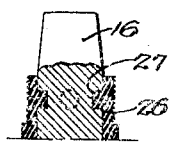

WALTER E. HOLLAND AND JAMES M. SKINNER, OF PHILADELPHIA, PENNSYLVANIA, ASSIGNORS TO PHILADELPHIA STORAGE BATTERY COMPANY, OF PHILADELPHIA, PENNSYLVANIA, A CORPORATION OF PENNSYLVANIA.

BATTERY-SEALING MEANS.

1,371,092.  Specification of Letters Patent.  Patented Mar. 8, 1921.

Application filed July 8, 1919. Serial No. 309,472.

*To all whom it may concern:*

Be it known that we, WALTER E. HOLLAND and JAMES M. SKINNER, citizens of the United States, residing in Philadelphia, Pennsylvania, have invented Battery-Sealing Means, of which the following is a specification.

One object of this invention is to overcome the objections inherent in the liquid seal around storage battery terminal posts as formerly constructed, by providing a conducting post with a bushing of hard rubber or other suitable insulating material of sufficient hardness and strength to make practicable the use thereon of a comparatively fine external thread, which when employed with a nut of similar material, or of hard metal, in conjunction with the cell cover and a soft rubber gasket, shall effectually prevent leakage of the electrolyte to the outside of the cell and form a permanently tight yet easily removable seal.

We also desire to provide a novel form of bushing and storage battery terminal post which when cemented or otherwise joined together will effectually prevent leakage of electrolyte along their coacting surfaces; the invention contemplating the elimination of exposed metal surfaces in the seal between the post and the cell cover.

These objects and other advantageous ends we attain as hereinafter set forth, reference being had to the accompanying drawings, in which, Figures 1, 2, 4, 6 and 7 are vertical sections of bushed terminal posts constructed in accordance with our invention;

Fig. 3 is a plan of that form of the invention shown in vertical section in Fig. 2; and Fig. 5 is a detached perspective view of certain of the parts constituting that form of the invention shown in Fig. 2.

In the above drawings 1 represents the lead alloy strap which in a storage battery cell has connected to it the terminal lugs of one group of the plates. This strap has cast integral with it an elongated cylindrical terminal post 16 extending at right angles to its plane and of such a length as to project through and beyond the cell cover 10;—its upper end 17 preferably being tapered for the reception of a suitable form of connecting or terminal conductor having a correspondingly tapered opening. Obviously the terminal post may be made of hexagonal, fluted or other than cylindrical cross section without departing from our invention. This post 16 of the strap is surrounded and inclosed, between the cover and strap body, by an insulating bushing 7 molded or otherwise so formed as to extend into a recess formed between it and a flange 6, which in Figs. 1 and 4, is internally threaded or serrated and is concentric with said post. The upper end of this bushing has a relatively fine external thread for the reception of a sealing nut 13 designed to draw a sealing gasket 12 against the under side of the cover 10, there being an annular, upwardly flanged collar 8 on said bushing adjacent said cover for the reception and support of this gasket.

In Figs. 2, 3 and 5, we have shown the insulating bushing 8ª as cemented to the flange 6 and to the post 16 so as to effectually prevent leakage and it is positively held from turning relatively to said post by an internal key projection 21 fitting a suitable keyway in the latter. If desired this form of the invention may be modified as shown in Fig. 4, in which the bushing, loosely fitted to the post, is threaded into the flange 6 so as to screw down on and compress a soft rubber packing ring or gasket 24 placed at the bottom of the cavity formed by said flange and it also may be cemented as at 23 or otherwise connected to the post so as to form a liquid-proof joint therewith. In some cases the bushing may be cemented in place when cold or it may be heated and shrunk on the post either with or without cement.

In that modification of the invention shown in Fig. 6 the flange 6 has been omitted and the lower part of the terminal post 16ª has been formed with a flange or annular extension 25 upon which is seated the packing washer or gasket 12 for preventing leakage between said post and the cover 10. In this case a short externally threaded bushing 26 of insulating material is cemented and keyed to that part of the post which projects through and above the cover and has threaded upon it the nut 13 for drawing together the cover and flange 25 to insure a tight seal with the gasket. In order to prevent longitudinal movement of the bushing upon the post, the latter is expanded or flanged at 28 above said bushing after this has been put in place. If desired the threaded bushing may be molded and cured in place on the terminal post 16 as shown in Fig. 7, in which case said post preferably has holes or depressions for the reception of integral projections 27 from the bushing whereby its rotation as well as longitudinal movement relatively to the post is effectually prevented.

In this construction, as well as in the others illustrated, the acid or other electrolyte is effectually excluded from the post 16, so that it cannot leak along the same and corrode its surface or escape between it and the bushing. Likewise there is no possibility of the escape of electrolyte past the sealing gasket between the bushing and the cover, since the insulating material of which the bushing and cover are made does not corrode or tend to draw electrolyte over its surface as does metal. Moreover because of the great compression of the gasket 12, which is made possible by the use of material which will permit relatively fine threading of the bushing and its nut 13 as compared with the hard lead heretofore used, the joint between the cover 10 and said bushing may be made and kept liquid tight, while the sealing nut may be readily removed and replaced as often as desired without danger of damaging or stripping the threads.

We claim:

1. The combination of a battery cell strap; a conductor projecting therefrom; an annular flange on the strap spaced away from and substantially concentric with said conductor; with an insulating bushing surrounding the conductor and extending into the cavity between the same and the flange to form a liquid-tight joint therewith.

2. The combination of a battery cell strap; a conductor projecting therefrom; with an insulating bushing surrounding said conductor and having a serrated connection with the strap.

3. The combination of a battery cell cover; a conductor projecting through the cover; with an insulating bushing surrounding the conductor and making liquid-proof joints with it and with the cover.

4. The combination of a battery cell cover; a conductor projecting through the cover; with an insulating bushing structurally independent of the cover making a liquid-proof joint with the conductor and extending around the same through the cover.

5. The combination of a battery cell cover; a conductor projecting through the cover; an insulating bushing making a liquid-proof joint with the conductor and extending around the conductor through the cover; with means for forming a liquid-proof joint between the bushing and the cover.

6. The combination of a battery cell cover; a conductor projecting through the cover; an insulating bushing extending around the conductor in removable engagement with the cover; with means for making a liquid-proof joint between the conductor and the bushing.

7. The combination of a battery cell strap; a post conductor electrically connected to said strap and extending at right angles thereto; a flange on the strap surrounding the post conductor; and an insulating bushing threaded into the space between the post conductor and the flange.

8. The combination of a battery cell cover; a cell post projecting through an opening in the cover; with an insulating bushing surrounding the post and making liquid-tight connection therewith, said bushing including an annular collar; and a gasket confined between said collar and the cover.

9. The combination of a battery cell cover; a cell post projecting through an opening in the cover and having an annular flange; with an insulating bushing surrounding the post and making liquid-tight connection therewith, said bushing including an annular collar; and a gasket confined between said flange of the post collar and the cover.

10. The combination of a cell cover; a cell post projecting through an opening in the cover; an insulating bushing surrounding the post and making liquid-tight connection therewith, said bushing including an annular collar; a gasket confined between said collar and the cover; with a nut threaded on the bushing outside of the cover for drawing the collar and cover into liquid-tight engagement with the gasket.

11. The combination of a battery cell strap having a laterally projecting flanged portion; a battery cell having a cover through which said projecting portion extends; and packing between said flange of the projecting portion and the cover.

12. The combination of a battery cell strap having a laterally projecting flanged portion; a battery cell having a cover through which said projecting portion extends; packing between said flange of the propecting portion and the cover; with means for clamping said packing in place.

13. The combination of a battery cell strap having a laterally projecting flanged portion; a battery cell having a cover through which said projecting portion extends; packing between said flange of the projecting portion and the cover; with means for clamping said packing in place, consisting of a bushing held to the projecting portion of the strap, and a nut threaded thereon in engagement with the cover.

14. The combination of a battery cell strap having a flanged terminal post; a battery cell having a cover through which said post projects; packing between the post flange and the cover; an insulating bushing rigidly held to the post against longitudinal movement; and means coacting with the bushing for clamping the packing in place.

15. The combination of a battery cell strap having a flanged terminal post; a battery cell having a cover through which said post projects; packing between the post flange and the cover; an insulating bushing structurally independent of the cover rigidly held to the post against longitudinal and rotary movement; and means coacting with the bushing for clamping the packing in place.

In witness whereof we affix our signatures.

WALTER E. HOLLAND.
JAMES M. SKINNER.